United States Patent [19]

Maier et al.

[11] Patent Number: 5,100,282
[45] Date of Patent: Mar. 31, 1992

[54] DEVICE FOR MOVING A LOADING TAILGATE

[76] Inventor: Peter Maier, Oberstr. 28a, DE-7703 Rielasingen 2; Klaus-Peter Brodbeck, Rheinfolderstr. 5, 7700 Singen, both of Fed. Rep. of Germany

[21] Appl. No.: 607,914

[22] Filed: Nov. 1, 1990

[30] Foreign Application Priority Data

Nov. 2, 1989 [DE] Fed. Rep. of Germany ....... 3936340

[51] Int. Cl.⁵ .................................................. B60P 1/44
[52] U.S. Cl. .................................................... 414/545
[58] Field of Search ............... 414/456, 557, 556, 540, 414/545, 406, 408, 419, 421

[56] References Cited

U.S. PATENT DOCUMENTS

| | | | |
|---|---|---|---|
| 2,033,243 | 3/1936 | Jester | 414/546 X |
| 2,391,813 | 12/1945 | Wood | 414/557 |
| 2,626,067 | 1/1953 | Berford et al. | 414/557 |
| 2,820,554 | 1/1958 | Vogel et al. | 414/557 |
| 3,415,395 | 12/1968 | Bishman | 414/557 |
| 3,602,381 | 8/1971 | Size et al. | 414/557 |
| 4,147,261 | 4/1979 | Dautel et al. | 414/557 |
| 4,780,044 | 10/1988 | Elskamp | 414/557 |

FOREIGN PATENT DOCUMENTS

| | | | |
|---|---|---|---|
| 173351 | 5/1952 | Australia | 414/557 |
| 2257461 | 8/1975 | France | 414/546 |

*Primary Examiner*—David A. Bucci
*Attorney, Agent, or Firm*—Bachman & LaPointe, P.C.

[57] ABSTRACT

In a device for moving a loading tailgate or similar swivelable body on, for example, a loading platform (1) of a vehicle, the loading tailgate is connected to a drive (3) via struts (5, 6) or support struts. In this case, at least two struts (5, 6) are to have, on the one hand, separate linkage points (7, 52) with the loading tailgate (4) and, on the other hand, they are to be connected to coupling profiles (30, 31) of the drive (3) rotating about a longitudinal axis (11).

13 Claims, 3 Drawing Sheets

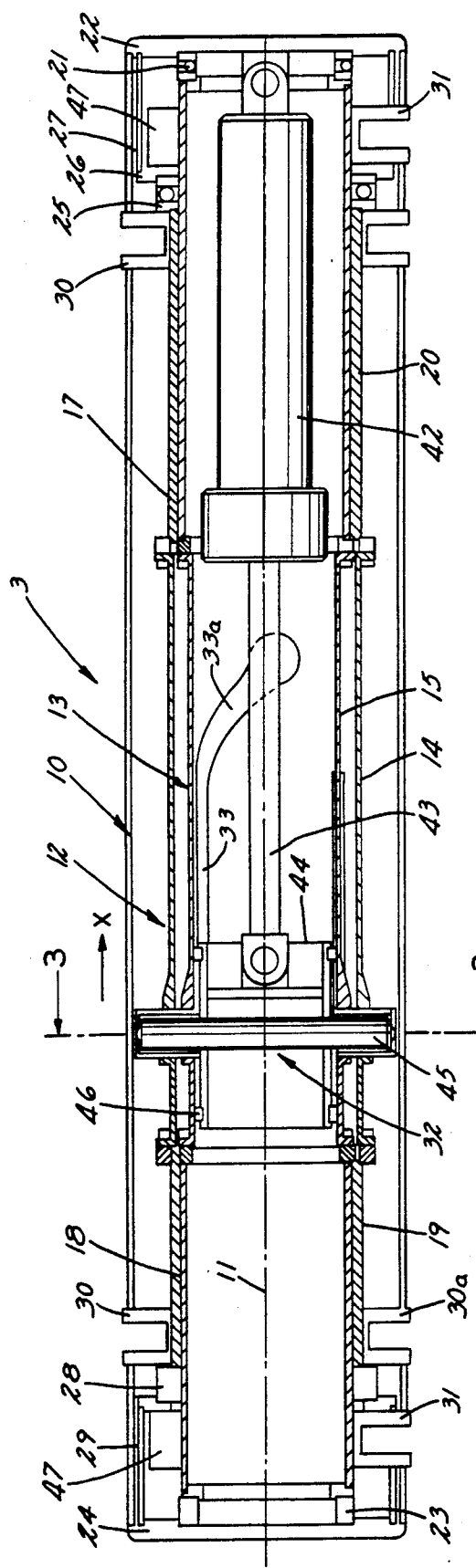
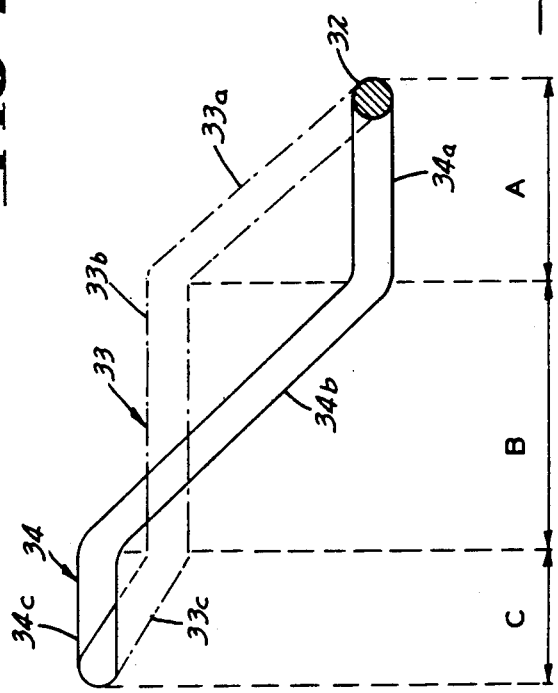
FIG-2
FIG-4

1

DEVICE FOR MOVING A LOADING TAILGATE

BACKGROUND OF THE INVENTION

The invention relates to a device for moving a loading tailgate or similar swivelable body on, for example, a loading platform of a vehicle, the loading tailgate being connected to a drive via struts or support struts.

It is known that the loading tailgates known today are moved by complex hydraulic drives. A loading tailgate must essentially complete three movements. These are firstly an opening movement from a vertical position of the loading tailgate into a horizontal position. There then follows a lifting movement downwards as far as the unloading surface, the loading tailgate remaining in the horizontal position.

Subsequently the loading tailgate is lowered further by a short swiveling movement so far downwards that it rests on both sides on the unloading surface. Likewise the loading tailgate must also be able to execute the movements in reverse.

For the execution of these movements, complex hydraulic units have been developed, two hydraulic rams engaging the loading tailgate on both sides in each case. In this process, a piston cylinder unit undertakes the swiveling movement of the loading tailgate while the other piston cylinder unit effects the lowering. These units are extremely voluminous and very heavy. Additionally, the four hydraulic cylinders are supplied with hydraulic fluid from a central unit so that a multitude of hoselines is required. These hoselines are frequently subjected to the risk of damage since they usually hang down. Thus they are frequently severed.

The objective set by the inventor was to develop a device of the above mentioned type, in which considerable volume and weight is saved and the overall movement is substantially simplified. Furthermore, all additional hoses or similar connection elements are to be dispensed with.

SUMMARY OF THE INVENTION

Leading to the achievement of this object is the fact that at least two struts have, on the one hand, separate linkage points with the loading tailgate and, on the other hand, are connected to coupling profiles of the drive rotating about a longitudinal axis.

These struts are arranged in relation to one another in the manner of a parallelogram, however, they can also be moved separately from one another. This dispenses with the individual hydraulic cylinders and thus also with the corresponding coupling hoses.

In this case, according to the invention, one strut serves for swiveling and the other strut for lowering or lifting the loading tailgate. Due to the distribution of force, it may be necessary to provide an additional support strut for the lowering and lifting operation. In the present exemplary embodiment, this support strut possesses a common linkage point with the strut assigned to it on the loading tailgate, on the other hand, however, it is linked to the drive offset by a rotation of 180° about the longitudinal axis.

Of course, it may be advisable to provide corresponding pairs of struts or combinations of struts on both sides of the loading tailgate.

A further advantage of the invention lies in the fact that the drive can now be supplied separately from the struts. To this extent it is no longer a compact, voluminous drive unit but individual parts which are only assembled in situ.

In the present invention, particular attention should be paid to the drive. In this context, the inventor has developed two tubes one lying inside the other which rotate about the above mentioned longitudinal axis. Incidentally, this longitudinal axis extends parallel to the rear edge of the loading tailgate while the struts are arranged in a plane approximately perpendicular to this longitudinal axis.

In the present exemplary embodiment, the coupling profiles circulate around this longitudinal axis, said coupling profiles being fixed to the respective tubes. For example, provision is made for the one or both coupling profile/s for the strut for lowering and lifting the loading tailgate or for the support strut to be connected to the outer tube while the strut effecting the swiveling movement of the loading tailgate has a coupling to the inner tube. In this case, exchange is, of course, also possible within the framework of the inventive concept.

The essential part of the present inventive concept is that only one drive member is assigned to both tubes, which drive member effects the rotation of the tubes and thus the rotation of the coupling profiles about the longitudinal axis of the drive. In a loading tailgate, the swiveling operation is usually followed by the lowering or lifting operation and then, in turn, a swiveling movement. To this extent, the rotation of the two tubes in relation to each other is designed such that the one tube is stationary when the other tube is in rotation. However, if the wish for a combined movement is expressed, this combined movement is also included in the present inventive concept as both tubes could also be moved together.

In order to control the corresponding movement of the tubes, i.e. their rotation about the longitudinal axis, link slots are provided in the tubes, which link slots have a certain contour. In the present exemplary embodiment, both these link slots are penetrated by a guide element, it also being possible, of course, for there to be guide elements for each individual link slot.

However, the coordination of the rotation of the tubes is facilitated by the common guiding by means of a guide element.

This guide element consists of a bolt-shaped sliding body which is engaged by the piston rod of a lifting cylinder and, as stated above, penetrates the link slots. By this means, the entire movement of the loading tailgate, whether it be the swiveling or lowering and lifting, is made possible by a single drive so that the entire hydraulic system is substantially simplified and is inexpensive to manufacture. It should be noted additionally that the hydraulic drive is only selected as an example. A pneumatic, electric or even, if adequate, a mechanical drive is, of course, also possible within the framework of the invention.

For reasons of simplicity and in order to save space, the lifting cylinder and the piston rod are situated inside the inner tube along the longitudinal axis. Thus the piston rod makes only a single stroke, which enables the loading tailgate to be moved.

After penetration of the link slots, the guide element is to be guided in an upper and a lower guide groove. The upper and lower guide grooves extend parallel to the longitudinal axis so that it is not possible for the guide element to be tilted.

Furthermore, rotary caps are placed on top of the bolt-shaped guide element on both sides, which rotary caps rotate in corresponding needle bearings. During their sliding motion through the guide grooves and link slots, these rotary caps roll off on corresponding groove walls or link walls.

Otherwise, with a mid axis perpendicular to the longitudinal axis, the guide element penetrates a thrust piston which, in turn, is connected to the piston rod. By this means, any possibility for the guide element to yield to any side under pressure is removed. If the guide element is moved along the longitudinal axis by the hydraulic drive, the tubes must inevitably follow the movement of the guide element by rotary movement.

In the present exemplary embodiment, the loading tailgate carries out two swiveling movements and one lowering or lifting movement. The link slots are also constructed correspondingly. For example, the link slot of the outer tube which only effects the lifting and lowering, has a central part extending obliquely relative to the longitudinal axis on the outer surface of the outer tube, which part is adjoined on both sides by a part extending parallel to the longitudinal axis. This means that a swiveling movement of the loading tailgate can take place firstly due to the other link slot before the previously mentioned link slot effects the lowering and lifting.

Correspondingly, the link slot in the inner tube now has a central region extending parallel to the longitudinal axis, which region is adjoined in each case by a region extending obliquely. The swiveling of the loading tailgate takes place within the obliquely extending region.

Since the link slots are of substantial importance, high requirements will also have to be placed on their resistance to wear. For this reason, it is expedient to manufacture the inner and outer tubes in the region of these link slots from a casting, for example made of steel. Casting also permits the shaping of rising link walls, on which the rotary cap of the guide element can roll off better. If these regions of the inner and outer tubes are made from castings, these should be semi-shell castings which are then welded together in the housing drive. This central region of the inner and outer tubes can be adjoined on both sides by customary extruded tube profiles made, for example, of aluminum which can be obtained more cheaply.

It is obvious that the tubes must be mounted in a manner adequate for rotation. For this reason, the tubes are encased by a housing which, in turn, has sufficient recesses or slots for the coupling profiles, the coupling profiles passing through these slots on rotational movement of the tubes.

Increased attention must be paid to this mounting, above all on the one side of the drive which is subjected to increased pressure loading. This takes place during lifting of the loading tailgate since, in this case, the guide element applies considerable pressure forces to the link slots and thus to the tubes.

In this case, the tubes should be mounted via corresponding thrust bearings In contrast, during lowering of the loading tailgate, hardly any drive output and thus absorption of pressure forces is required since, in this case, the guide element will attempt to follow the link slots solely due to the weight of the loading tailgate. For this reason, plastic bearings arranged on this opposite side are sufficient.

As stated, the entire drive can be of very compact construction, the corresponding hydraulic unit for the lifting cylinder preferably being provided in a chamber after the tubes. This drive is then fixed to the loading platform via corresponding coupling angles or attachment flanges so that there only has to be one connection of the drive to the loading tailgate via the supplied struts.

If a folding loading tailgate is used, the present inventive concept of course also covers a design of the link slot which makes this folding together and folding out of the loading tailgate possible. Furthermore, the arrangement of a third tube is also readily possible, by means of which certain movements of the loading tailgate can be carried out additionally. In this case, no limits shall be placed on the present invention.

IN THE DRAWINGS

Further advantages, features and details of the invention result from the subsequent description of preferred exemplary embodiments and with reference to the drawing, in which:

FIG. 2 shows a longitudinal section through a drive according to the invention of the loading tailgate in FIG. 1;

FIG. 4 shows a plan view of the rolled-off link guides according to the invention.

DETAILED DESCRIPTION

Figure 1:
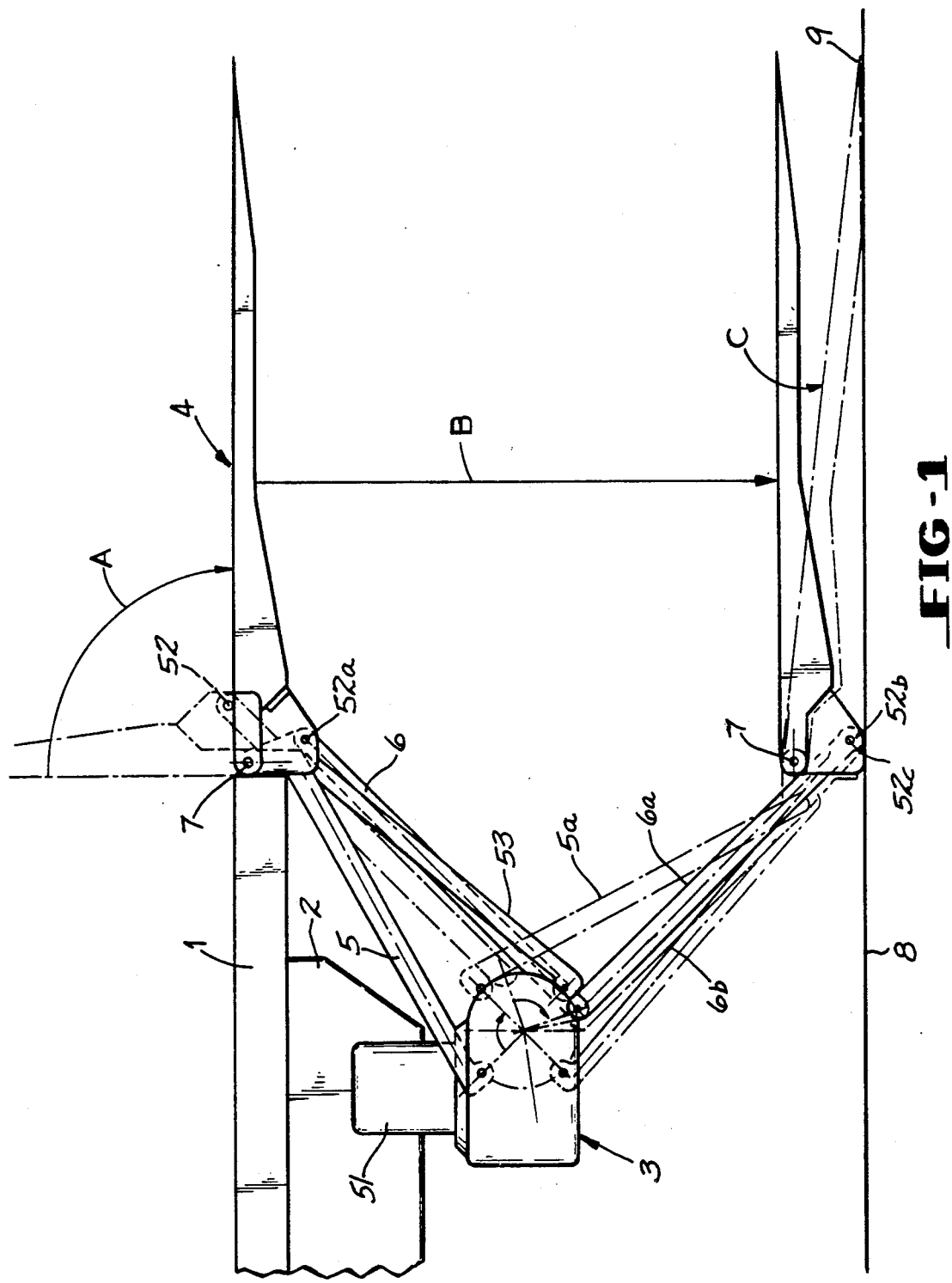
FIG. 1 shows a diagrammatic lateral view of the movement of a loading tailgate in the position of use.

According to FIG. 1, a drive 3 for a loading tailgate 4 is illustrated on an attachment flange 2 on the underside of a loading platform 1 of a corresponding truck. This loading tailgate 4 is connected via struts 5 and 6 to the drive 3 in such a way that essentially three sequences of movement of the loading tailgate 4 are possible by relative movement of the struts 5 and 6 in relation to each other. A characterizes the movement of the loading tailgate 4 by approximately 90° about an axis of rotation 7, by which means the loading tailgate 4 is moved from an approximately vertical position illustrated in dot-dashed lines (closed position) into an approximately horizontal position in which goods to be unloaded can be driven or placed onto the loading tailgate.

Then a lifting movement B takes place, by means of which the loading tailgate is lowered onto an unloading surface 8, for example the ground. In this case, the loading tailgate 4 remains in the above mentioned horizontal position.

Due to a further slight rotation about the pivot point 7 by the rotational movement C, a tilting of the loading tailgate 4 takes place into a position illustrated in dot-dashed lines, in which a tip 9 or an edge formed by the tip 9 rests on the loading surface 8 and, in this way, easy unloading of the lowered goods can take place.

These three movements A, B and C of the loading tailgate 4 are carried out by the drive 3. According to FIG. 2, said drive has a housing 10, in which two tubes 12 and 13 rotating one inside the other are guided along a longitudinal axis 11. Both tubes consist in each case of three tube portions which can be shaped out of different material and in accordance with different manufacturing processes. The details serving for this are only examples.

For example both tubes can each have a central piece which is shaped from semi-shells 14 or 15. These semi-shells are then, for example, casting shells and are manufactured from steel. This is shown more clearly in FIG. 3 where the respective semi-shells are defined as 14a and 14b and 15a and 15b and they are interconnected via corresponding welds 16.

Tube pieces 17 and 18 and 19 and 20 are flanged onto each central piece on both sides. These tube pieces can be pressed, for example, from an aluminum billet.

Both tubes 12 and 13 are spaced apart, the spacings of the semi-shells 14 and 15 and the tube pieces 17, 18 or 19, 20 respectively being selected to be different in the present exemplary embodiment. However, this has no influence on the inventive concept. In any event, the spacing must be selected such that the inner tube 13 can rotate without difficulty in the outer tube 12 or the outer tube 12 about the inner tube 13.

To facilitate the rotation, the inner tube 13 is supported towards the right against a thrust bearing 21 which is held by a lid 22 of the housing 10. At the other end, a plastic bearing 23 suffices, via which the inner tube 13 is likewise supported against the other lid 24.

The outer tube 12, in turn, is connected on the right side via a thrust bearing 25 and a bearing race 26 to a housing ring 27. At the other end, a plastic bearing 28 which is supported on a housing ring 29 also suffices, in turn, for this purpose.

In these bearings, the outer tube 12 or the inner tube 13 rotate about the axis of rotation 11, in which case they carry the corresponding coupling profiles 30 and 31 along with them. These coupling profiles 30 and 31 are arranged correspondingly at the front on both sides of the drive 3 and serve for coupling the above mentioned struts 5 or 6.

In this case, the strut 5 lies fixedly on the coupling profile 30 of the outer tube 12 and the strut 6 lies fixedly on the coupling profile 31 of the inner tube 13.

Figure 3:
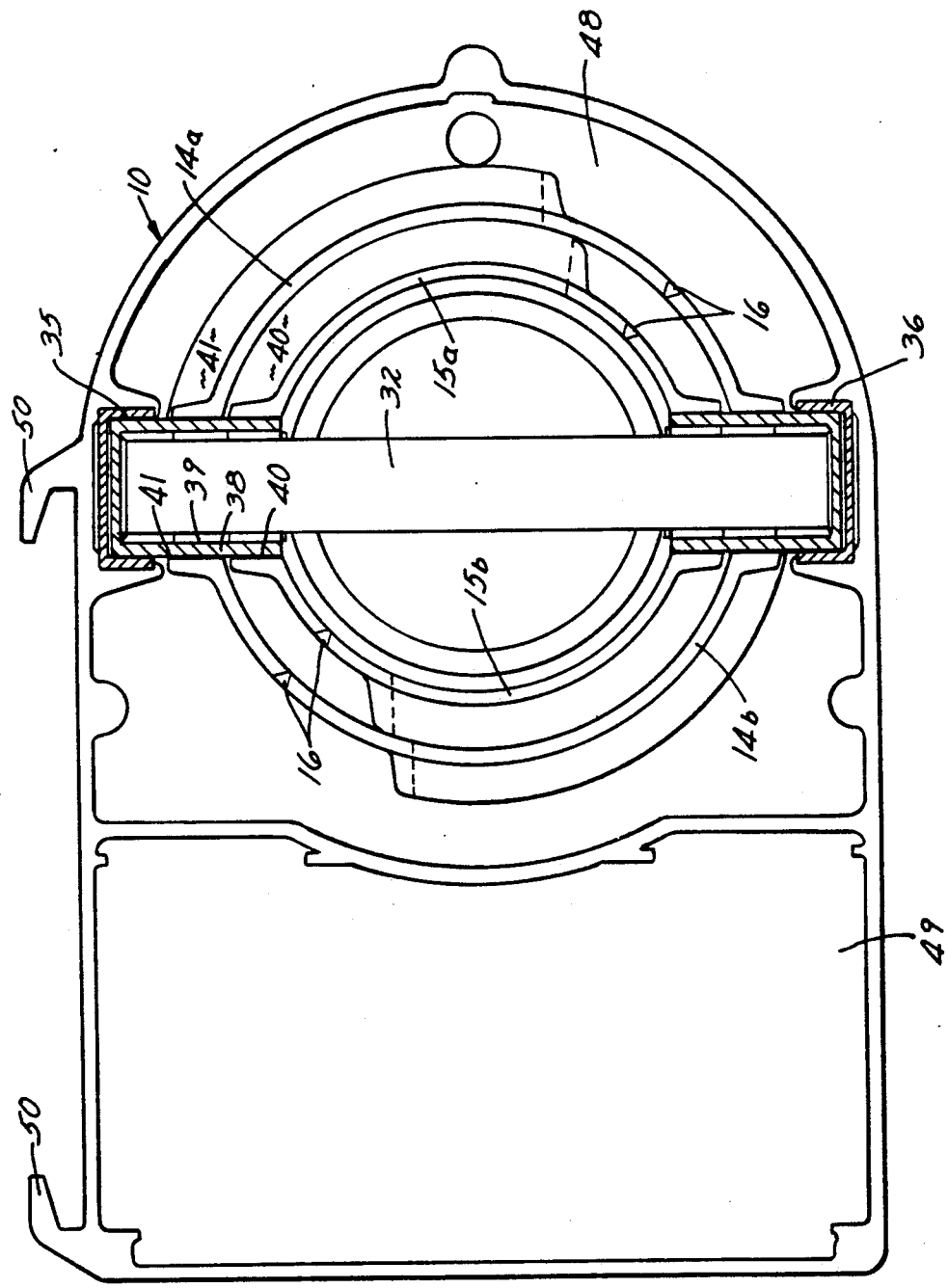
FIG. 3 shows a cross-section through the drive according to FIG. 2 along the line III—III in an enlarged illustration.

The rotational movement of the outer tube 12 or of the inner tube 13 about the longitudinal axis 11 takes place by means of a guide element 32 which passes through link slots 33 or 34 of the inner tube 13 or of the outer tube 12 respectively. For this purpose, the guide element 32, as shown in particular in FIG. 3, is guided in an upper guide groove 35 and a lower guide groove 36. The guiding takes place parallel to the longitudinal axis 11. Furthermore, a rotary cap 38 is placed on top of the guide element 32 on both sides, which rotary cap is supported against the guide element 32 via needle bearing 39. On movement of the guide element 32 in direction x, the rotary cap 38 rotates on a respective link wall 40 of the inner tube 13 or link wall 41 of the outer tube 12 so that there is a rotation of the outer or inner tube 12 or 13 about the longitudinal axis 11 as a result of the shaping of the link slots 33 and 34. By this means, the struts 5 or 6 are moved correspondingly.

In order to improve the guiding, the link walls are raised, as shown in particular in FIG. 3, so that a channel-shaped guide groove arises around the link slots.

The movement of the guide element 32 in direction x takes place in the preferred exemplary embodiment due to a preferably hydraulically operating lifting cylinder 42 which is linked at the bottom to the lid 22.

It extends approximately parallel to the longitudinal axis 11. This lifting cylinder 42 is connected by a piston rod 43 to a thrust piston 44 which is penetrated by the bolt-shaped guide element 32. In this case, the mid axis 45 of the guide element 32 extends approximately perpendicular to the longitudinal axis 11. Sliding bearings 46 serve for the guiding of the thrust piston 44 inside the inner tube 13.

Due to the fastening of the guide element 32 inside the thrust piston 44 and due to the guiding of the guide element 32 inside the guide groove 35, tipping of the guide element 32 is avoided on all sides.

It should otherwise be mentioned that the coupling profiles 30 or 31 of course engage in the housing 10 in respective recesses 47 in order to bring about an articulated connection there with the struts 5 or 6 in each case.

It is furthermore visible in FIG. 3 that the housing 10 consists of a space 48 for the arrangement of the tubes 12 and 13 and, furthermore, a further chamber 49 is provided behind this space 48, which chamber can be occupied, for example, by corresponding hydraulic units for the cylinder 42. Furthermore, rail strips 50 are moulded onto the housing 10, by means of which rail strips the housing 10 is fastened to a coupling angle 51.

The sequence of movement is to be explained in detail below with reference to the FIGS. 1 and 4.

In the closed position of the loading tailgate 4, the guide element 32 is in the right part of the links, as illustrated in FIG. 4. It penetrates both the link 33 and the link 34. For opening the loading tailgate 4, the guide element 32 is now set in motion towards the left via the lifting cylinder 42 or the piston rod 43. In this case, it passes through a first link part 34a of the link slot 34 in the outer tube 12, which link part extends parallel to the longitudinal axis 11. This means that this outer tube 12 remains stationary so that the strut 5 connected to it is not moved either. By this means, it is achieved that the axis of rotation 7 remains fixed and the loading tailgate 4 can complete the rotational movement A about this axis of rotation 7.

At the same time, however, the guide element 32 also passes through a link part 33a of the link slot 33 which, however, perforates the outer surface of the inner tube 13 extending obliquely relative to the longitudinal axis 11. By this means, the inner tube 13 is rotated about the longitudinal axis 11, the strut 6 being carried along via the coupling profile 31. This strut 6 now passes from the position illustrated by dot-dashed lines in FIG. 1 into a position illustrated by an uninterrupted line, at which position there is also the reference numeral 6. A corresponding linkage point 52 of this strut 6 is moved in this manner into the position denoted as 52a, the loading tailgate 4 being unfolded Now the guide element 32 enters a link slot region 33b arranged parallel to the longitudinal axis 11 so that no further swiveling of the loading tailgate 4 takes place.

In contrast, the guide element 52 in the link slot 34 enters a slot part 34b perforating the outer surface of the outer tube 12 obliquely relative to the longitudinal axis 11 so that now a rotation of the outer tube takes place. This rotation takes place by approximately 90°, the loading tailgate 4 being lowered onto the unloading surface 8. In this case, the strut 5 passes into the position in dot-dashed lines defined as 5a while the strut 6 is moved into the position in uninterrupted lines defined as 6a. As a result of the parallelogram-type guiding of the two struts 5 and 6, the loading tailgate 4 remains in its horizontal position.

The guide element 32 inside the link slot 34 now passes over into a part 34c extending parallel to the longitudinal axis 11, a further rotation of the outer tube being avoided. In contrast, the guide element 32 passes through a region 33b of the link slot 33, which region, in turn, extends obliquely in the outer surface of the inner tube 13 so that the strut 6a is moved slightly further. This is indicated, in turn, by dot-dashed lines at 6b. The linkage point 52b is displaced to 52c, the axis of rotation 7, however, remaining stationary. By this means, a swiveling of the loading tailgate 4 takes place in direction C.

In the present exemplary embodiment, the strut 5 is assigned a further support strut 53 which possesses, on the one hand, its linkage point in common with the strut 5 in the axis of rotation 7. On the other hand, however, a further coupling profile 30a is provided on the outer tube lying opposite by 180° so that this support strut 53 completes the same movements as the strut 5.

No great lifting force is required to open or lower the loading tailgate 4 since solely the weight of the loading tailgate 4 effects a following of the guide element 32 along the link slots 33 and 34. For this reason, no particular thrust bearing of the outer tube 12 or the inner tube 13 in relation to the left-hand lid 24 or the housing ring 29 is necessary either.

However, it is a different case with the lifting of the loading tailgate 4, on which there may still be corresponding loads. In this case, considerable lateral forces act on the guide element 32 via the link walls 40 or 41 and, furthermore, considerable pressure forces act on the tubes 12 or 13 in direction x. For this reason, it is necessary to provide in the right part of the drive 3 corresponding thrust bearings 21 and 25 which can absorb these pressure forces.

We claim:

1. A device for moving a loading tailgate comprising:
   (a) a first pair of struts provided on one side of the loading tailgate, one of said first pair of struts having one end connected to said tailgate by a first linkage point and another end connected to one end of a first coupling profile and another of said first pair of struts having one end connected to said tailgate by a second linkage point and another end connected to a second coupling profile;
   (b) a second pair of struts provided on another side of the loading tailgate, one of said second pair of struts having one end connected to said tailgate by a third linkage point and another end connected to one end of a third coupling profile and another of said second pair of struts having one end connected to said tailgate by a fourth linkage point and another end connected to one end of a fourth coupling profile; and
   (c) means for coupling said first, second, third and fourth coupling profiles to a common drive for turning said first, second, third, and fourth coupling profiles on a mutual arc of a circle about a mutual longitudinal axis by said common drive.

2. A device according to claim 1 wherein the first coupling profile is connected to an outer tube and the second coupling profile is connected to an inner tube and said common drive drives both said outer and said inner tubes rotatably about a single longitudinal axis wherein one of said outer and said inner tubes is inside another of said outer and said inner tubes.

3. A device according to claim 2 wherein the common drive rotates in a selective manner one of said outer and said inner tubes while another of said outer and said inner tubes is held stationary.

4. A device according to claim 3 wherein a connection between said outer and said inner tubes and said first and second coupling profiles comprise link slots which are penetrated by guide elements.

5. A device according to claim 4 wherein said guide elements comprise a bolt-shaped sliding body which is engaged by a piston rod associated with a lifting cylinder.

6. A device according to claim 5 wherein the piston rod and the lifting cylinder are located about said longitudinal axis within the tube which rotates inside the other tube.

7. A device according to claim 4 wherein the link slots and the guide element are guided in grooves which extend parallel to the longitudinal axis.

8. A device according to claim 7 wherein rotary caps are placed on top of the bolt-shaped guide elements on both sides thereof wherein the rotary caps are supported on bearings.

9. A device according to claim 4 wherein the guide element with a mid axis perpendicular to the longitudinal axis penetrates a thrust piston which is connected to the piston rod.

10. A device according to claim 9 wherein the link slot in the outer tube firstly has a part extending parallel to the longitudinal axis, then a part extending over an outer surface of the outer tube obliquely relative to the longitudinal axis, and then again a part extending parallel to the longitudinal axis.

11. A device according to claim 10 wherein the link slot in the inner tube firstly has an obliquely extending region, then a region extending in parallel, and then, in turn, an obliquely extending region.

12. A device according to claim 11 wherein the outer and the inner tubes are supported at least on one side via thrust bearings against a housing of the drive.

13. A device according to claim 12 wherein at least a region of the outer and the inner tubes, which has the link slots, is shaped out of semi-shell castings.

* * * * *